Feb. 11, 1969      F. R. EMMONS      3,426,984

AIRCRAFT PRESSURIZATION OUTFLOW VALVE

Filed April 24, 1967

VALVE CLOSED – TORQUE EQUAL – NET TORQUE BALANCE WITH EQUAL RATIO $T_1 = T_2$

INVENTOR
FLOYD R. EMMONS
BY Norman Friedland
ATTORNEY

United States Patent Office 3,426,984
Patented Feb. 11, 1969

3,426,984
AIRCRAFT PRESSURIZATION OUTFLOW VALVE
Floyd R. Emmons, Granby, Conn., assignor to United
Aircraft Corporation, East Hartford, Conn., a corporation of Delaware
Filed Apr. 24, 1967, Ser. No. 633,093
U.S. Cl. 244—117                               6 Claims
Int. Cl. B64d *13/02;* B64c *1/00*

ABSTRACT OF THE DISCLOSURE

A pair of cooperating flat plate-like valve elements are pivotally mounted at their respective ends and overlap each other at the outer periphery so as to be substantially flush with the skin of the aircraft whereby serving as a variable area throttling valve to maintain the pressure in the cabin of the aircraft at a predetermined value. The inner surfaces of the overlapping ends define a thrust nozzle when in a given position. One element projects into the airstream to define a ram air shield in another position.

*Cross-references to related applications*

This application is directed to subject matter disclosed in an application entitled "Aircraft Pressurization Outflow Valve" by F. Emmons and C. Seger filed on even date and assigned to the same assignee, and an application entitled "Valve Construction" by T. Rhines also filed on even date and assigned to the same assignee.

*Background of the invention*

This invention relates to cabin pressure regulators and particularly to the outflow valve adapted to discharge fluid from the cabin in accordance with a schedule for maintaining the cabin pressure at a predetermined level.

As was disclosed and claimed in the patent application entitled "Aircraft Pressurization Outflow Valve" by F. Emmons and C. Seger, supra, a gate-type valve having a single flat plate-like valve element was rotatable to extend into the slipstream so as to form a shield to prevent the ram air from interfering from the cabin discharge air. This invention constitutes an improvement thereover by providing a pair of gate-like valve elements each pivotally connected at their respective ends and are ganged so as to simultaneously rotate each in a clockwise or a counterclockwise direction for effectuating opening and closing thereof. The problem incident with the apparatus disclosed in the application mentioned above was the fact that during take-off the valve had to be shifted so as to assure that the valve element projected into the airstream. This was occasioned by the fact that in the landing of the aircraft the valve would normally be in an open position which would in this instance locate the valve element in the retracted position. In take-off, it is necessary to have the valve positioned in a ram shield position which would necessitate a repositioning of the valve. To obviate this problem, the valve, in accordance with this invention, is constructed into two pieces cooperating with each other for providing the necessary throttling, the necessary thrust recovery, and the necessary ram shielding requirements. When in the wide open position, one of the valve elements extends into the airstream so that when in the take-off mode, it is in the position necessary to provide the ram shielding. This does away with the requirement of having to reposition the valve durng take-off, and obviously eliminating another burden that would normally be required of the aircraft operator.

Additionally, in accordance with this invention the axis of rotation is located closer to the skin of the aircraft resulting in a reduction of the moment arm and hence the torque required. This also serves to render the valve less susceptible to vibrating and G load forces. Such a construction also can be made lighter than the single valve element design since the supporting structure is less complicated and closer to the valve element.

*Summary of invention*

The primary object of the invention is to provide an improved outflow valve for an aircraft cabin pressure regulating system.

In accordance with the present invention a pair of pivotally mounted flat plate-like valve elements are positioned relative to each other so as to provide means for throttling the air discharging from the aircraft cabin, ram shielding and thrust recovery.

A still further object of this invention is to provide varying linkages to vary the linkage ratio so as to make the valves substantially self-actuating when there is a pressure drop thereacross.

A still further object of this invention is to provide an improved simplified outflow valve that exhibits low operating torque, less expensive to manufacture and susceptible to accommodating different valve element configurations to improve the opening torque.

Other features and advantages will be apparent from the specification and claims and from the accompanying drawings which illustrate an embodiment of the invention.

*Description of the preferred embodiment*

Figure 1:
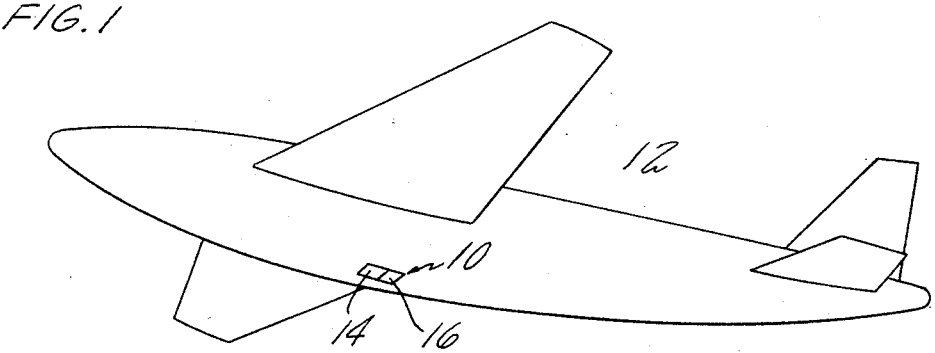
FIGURE 1 is a schematic illustration of an aircraft wherein the valve is mounted on the underbody of the fuselage.

As is shown in FIGURE 1, the outflow valve generally illustrated by reference numeral 10 is suitably supported to be flush with the skin of the aircraft generally illustrated by reference numeral 12 and comprises a pair of flat plate-like valve elements 14 and 16.

Figure 2:
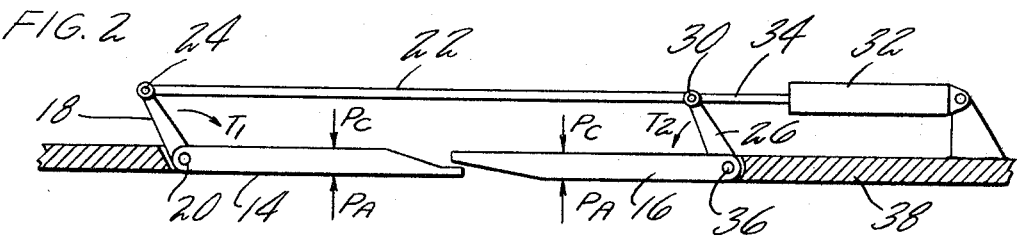
FIGURE 2 is a fragmentary view partly in section and partly in elevation illustrating the details of the invention.

As noted from FIG. 2, the valve element 14 is pinned to link 18 by pin 20 which, in turn, is suitably connected to link 22 at a suitable joint 24. Valve element 16 is also connected to link 22 by the link 26. Schematically illustrated is actuator 32 responding to a cabin pressure regulating system for positioning link 22 via the rod 34 which is connected at pin 30. Movement of link 22 causes the valve element 14 to rotate about axis 20 and valve element 16 to rotate about axis 36 noting that the valve elements fit in an opening formed in the skin 38 of aircraft 12. When lever 22 is positioned to the right, it causes links 18 and 26 to rotate for rotating valve elements 14 and 16 in a clockwise direction.

Figure 3:
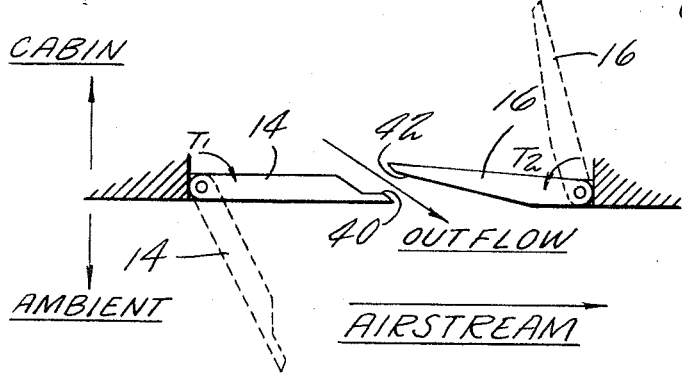
FIGURE 3 is a schematic illustration showing the valve in normal cruise and ram shielding positions.

When in the position as illustrated by FIG. 3, the inner surfaces 40 and 42 of valve elements 14 and 16 located at the outer extremity define a convergent or convergent-divergent nozzle for effectively imparting thrust recovery for the air discharging from the cabin into the airstream.

When the valve is positioned, as illustrated by the dash lines shown in FIG. 3, it will be appreciated that it is in the opened position. This is the position the valve assumes when the pressure of ambient air is sufficiently high for the safety and comfort of the passengers, say below 8000 ft. altitude. As is evident from FIG. 3, valve element 14 projects into the slipstream causing the airstream to bend away from the opening in the skin of the aircraft. This serves to shield the discharging air from the ram air and preventing the ram air from causing a pressure rise and interfering with the discharging flow. Hence, when the aircraft is in the take-off mode, the position of the outflow valve is already in the wide open position or in close proximity thereto. Consequently, the valve is already in the shielding position thus obviating the necessity of the pilot or operator for repositioning the valve.

Figure 4:
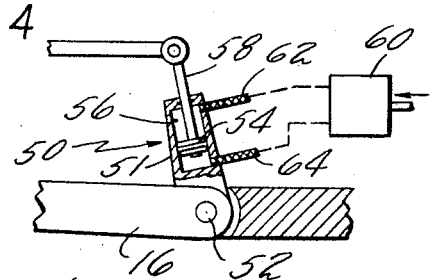
FIGURE 4 is a fragmentary view partly in section and partly in schematic illustrating another embodiment.

The embodiment shown in FIG. 4 does away with the valve actuator 32. Like numerals of FIG. 4 refer to like parts referenced in the other figures. Since ambient and cabin air act on the valve elements, it is possible to size these elements to substantially balance each other and take advantage of the pressure drop so that the pressures acting thereon automatically position the valve. It is, however, necessary to change the linkage ratio for obtaining self-actuation. A suitable means for varying the linkage ratio, i.e., the ratio of links 18 and 26 of FIG. 2, is the mechanism illustrated by reference numeral 50.

In the embodiment of FIG. 4, link 26 is replaced by mechanism 50 and all other elements are the same. Casing 51 has one end pinned to valve element 16 by pin 52 to rotate valve element 16. Piston 54 is fitted into bore 56 formed in casing 51. One end of plunger 58 is fixed to piston 54 and the other end is pivotably connected to link 22. Pressure from control 60, schematically illustrated, is admitted to bore 56 via lines 62 or 64 on either end of piston 54 to cause it to translate and hence adjust the height of member 50. The control 60 responds to the cabin pressure regulator, not shown.

It should be understood that the invention is not limited to the particular embodiments shown and described herein, but that various changes and modifications may be made without departing from the spirit or scope of this novel concept.

I claim:
1. An outflow valve for an aircraft cabin adapted to maintain the pressure therein at a predetermined level comprising, in combination:
   a pair of valve elements each pivotably connected adjacent the skin of the aircraft and extending flush with the skin over an opening formed therein,
   end portions on the respective ends of said valve elements overlapping each other and cooperating with each other to define a thrust nozzle when in one position,
   one of said valve elements extending in the slipstream adjacent said opening for shielding the opening from the ram air when in another position, and
   means for imparting synchronous movement to said valve elements for moving said valve elements in opposite directions relative to each other.

2. An outflow valve as claimed in claim 1 wherein the axes of the pivots for each of said valve elements are parallelly mounted relative to each other.

3. An outflow valve as claimed in claim 1 wherein each of said valve elements is configured in a flat plate-like shape.

4. An outflow valve as claimed in claim 1 wherein the end portions of said valve elements cooperate with and overlap each other to be in sealing relationship.

5. An outflow valve for an aircraft cabin adapted to maintain the pressure therein at a predetermined level comprising, in combination:
   a pair of valve elements each pivotably connected adjacent the skin of the aircraft and extending flush with the skin over an opening formed therein,
   end portions on the respective ends of said valve elements overlapping each other and cooperating with each other to define a thrust nozzle in one position,
   one of said valve elements extending in the slipstream adjacent said opening for shielding the opening from the ram air in another position,
   a first link connected to one of said valve elements at the point where said valve element is pivotally connected,
   a second link connected to the other of said valve elements at the point where said valve element is pivotally connected,
   a third link spaced from said valve elements interconnecting said first and second links, and
   actuating means connected at a point where said first link and said third link are joined for translating said third link whereby said valve elements are synchronously moved relative to each other.

6. An outflow valve for an aircraft cabin adapted to maintain the pressure therein at a predetermined level comprising, in combination:
   a pair of valve elements each pivotably connected adjacent the skin of the aircraft and extending flush with the skin over an opening formed therein.
   end portions on the respective ends of said valve elements overlapping each other and cooperating with each other to define a thrust nozzle in one position,
   one of said valve elements extending in the slipstream adjacent said opening for shielding the opening from the ram air in another position,
   a first link connected to one of said valve elements at the point where said valve element is pivotally connected,
   a second link connected to the other of said valve elements at the point where said valve element is pivotally connected,
   a third link pivotally connected to said first and second links, and
   means for changing the length of said first link so as to change the ratio of the length of said first and second links.

References Cited

UNITED STATES PATENTS

| | | | |
|---|---|---|---|
| 1,041,636 | 10/1912 | Lamoreaux | 251—212 X |
| 2,515,639 | 7/1950 | Draney | 244—118 |
| 3,258,206 | 6/1966 | Simonson | 244—12 X |

MILTON BUCHLER, *Primary Examiner.*

T. W. BUCKMAN, *Assistant Examiner.*

U.S. Cl. X.R.

251—212; 98—1.5